Patented Oct. 24, 1950

2,526,892

UNITED STATES PATENT OFFICE 2,526,892

DODECYL AMINE SALT OF PENTACHLORPHENOL

Arthur Minich, Westfield, N. J., assignor to Nuodex Products Co., Inc., Elizabeth, N. J., a corporation of New York No Drawing. Application May 21, 1946, Serial No. 671,406

1 Claim. (Cl. 260—567.5)

This application is a continuation-in-part of application Serial Number 605,188, filed July 14, 1945, which is now abandoned.

This invention is a toxicant comprising an amine derivative of a halogenated phenol which may be used, according to the present invention, alone, in solution, or as an additive in various compositions or with an appropriate vehicle to function as a fungicide, bactericide, insecticide, mildewproofing agent, rotproofing agent, disinfectant, germicide, an anti-fouling ingredient of marine paints, and for analogous purposes. It has been found useful in the control or prevention or destruction of a wide variety of micro and macro organisms of plant and animal origin of harmful nature.

The compositions of this invention are produced by reacting together an amine and a halogenated phenol, more particularly an aliphatic amine with an alkyl chain length of 6 to 18 carbon atoms. In practice highly satisfactory results have been obtained by reacting together one or more of the amines with at least one of the halogenated phenols in substantially stoichiometrical proportions, so as to obtain phenolates which are substantially water-insoluble and substantially oil-soluble.

The reaction may be and is preferably carried out at temperatures in the range of 150°–230° F., although lower temperatures or room temperatures may be satisfactorily employed. The reaction proceeds quite rapidly and a homogeneous compound is readily formed.

The end product may subsequently be dissolved in a suitable solvent, such as mineral spirits, xylol, toluol, isophorone, ethyl alcohol, butyl alcohol, diacetone alcohol, and similar organic solvents. It may also be easily dispersed or diluted with other non-solvent vehicles, such as certain coating material vehicles useful in connection with paints, varnishes, sizings, etc. It has also been found practicable to carry out the reaction in the presence of a solvent or non-solvent vehicle or both, so that the end product is formed with either or both the solvent and vehicle and may be used in this form for various purposes.

It is even possible, in practice, to utilize water as a dispersion vehicle, notwithstanding the end products are not water-soluble. This may be conveniently accomplished by preparing emulsions and for such purpose certain emulsifying agents may be added to the composition, e. g., petroleum sulphonates.

Also the toxicants of this invention may be added to such materials as paraffin wax, aluminum stearate, chlorinated paraffins, casein compositions, leather dressings, etc., to impart toxicant properties to the resulting composition.

The toxicants of this invention have been very thoroughly investigated in the mildewproofing and preservation of many materials and articles of commerce. For example, these toxicants have been evaluated after introduction into casein paints. Paints of this type are highly susceptible to microbial decomposition during storage and they are also extremely vulnerable to attack by mildew organisms after application to surfaces. Under ordinary conditions of storage, they decompose very rapidly in the containers unless a preservative is present. They will also rapidly succumb to fungus attack after application to surfaces unless a fungicide is present. The toxicants of this invention have been found to possess extreme efficiency in protecting the casein paints during storage as well as after application.

In evaluation tests which have been carried out, various percentages of the toxicants were employed and the results were compared with those obtained with other fungicides heretofore commonly available for this purpose. The present fungicides proved to be far superior to prior toxicants. The amounts of the present toxicants to be employed in such paints depend on the severity of the conditions to be encountered, but generally a range of from 1% to 10% of the toxicant per weight of the casein contained in the paint has been found to be adequate.

The composition is also useful in paints carrying other protein matter similar to casein, such as those isolated soya bean proteins which embody the general characteristics of milk casein. Good results have also been obtained in connection with the use of the composition in other paints, such as oil paints, enamels and lacquers.

The toxicants of this invention were also tested in many other compositions, including casein leather dressings, house paints, and sizings, and they have shown themselves to be highly efficient.

The toxicants of this invention may be employed to advantage as an insecticide, a constituent of anti-fouling paints, and in other compositions wherever a toxicant is indicated.

For the purpose of concrete illustrative disclosure of this invention, the following examples are given:

*Example 1*

249.1 grams of 2-bromo-4-phenylphenol are mixed with 200 grams of "Coconut" amine (a product of Armour and Co., Chicago, Ill.; it consists of a mixture of amines of alkyl chain lengths similar to those of the fatty acids derived from cocoanut oil), at a temperature of 110° F. The reaction is exothermic, and the product, "Coconut" amine 2-bromo-4-phenylphenolate, is a homogeneous brown crystalline solid, readily soluble in mineral spirits, toluene, xylene, ethanol, and most common organic solvents.

Example 2

197.5 grams of 2,4,5-trichlorphenol are mixed with 200 grams of "Coconut" amine at 180° F. The reaction, when started, is exothermic. The product, "Coconut" amine 2.4,5-trichlorphenolate, is a liquid that is soluble in mineral spirits, xylol, toluene and ethanol.

Example 3

269 grams of 2,2'-dihydroxy-5,5'-dichlorodiphenylmethane are mixed with 266 grams of octadecenylamine (a product of Armour & Co., Chicago, Ill., consisting of a mixture of chemically pure octadecenyl, hexadecenyl and octadecadienyl amines, having an average molecular weight of 266) and the temperature raised to 180° F. An exothermic reaction occurs. The product, the mono-octadecenylamine salt of 2,2'dihydroxy-5,5'-dichlorodiphenylmethane is a viscous amber liquid, soluble in mineral spirits, toluene, xylene, benzene, ethanol, and the common organic solvents.

Example 4

269 grams of 2,2'-dihydroxy-5-5'-dichlorodiphenylmethane are mixed with 297 grams of octadecyldimethyl amine at 180° F. The reaction is mildly exothermic. The product, a viscous amber liquid, consists of the octadecyldimethylamine salt of 2,2'-dihydroxy-5,5'-dichlorodiphenylmethane. It is soluble in mineral spirits, toluene, benzene, ethanol, and other common organic solvents.

Example 5

231.4 grams of 2,3,4,6-tetrachlorphenol is added to a solution of 185 grams of dodecylamine in 139 grams of ethylene glycol monoethyl ether. The reaction is exothermic. The product is a 75% solution of dodecylamine 2,3,4,6-tetrachlorphenate in ethylene glycol monoethyl ether. The solution is pale amber in color, and is miscible with mineral spirits, toluene, ethanol and most of the common organic solvents. The amine salt may also be prepared without the presence of any solvent, and possesses similar solubility characteristics.

Example 6

266.4 grams of pentachlorphenol is added to a solution of 200 grams of "Coconut" amine in 155 grams of ethylene glycol monoethyl ether. The reaction is exothermic. The product is a 75% solution of "Coconut" amine pentachlorphenate in ethylene glycol monoethyl ether. This solution is miscible with mineral spirits, toluene, ethanol, and most of the common organic solvents.

Example 7

204 grams of 2-chloro-4-phenylphenol are mixed with 266 grams of octadecenyl amine (from Armour & Co.) at 120° F. The reaction is exothermic. The product, a yellow crystalline solid, consists of the octadecenylamine salt of 2-chloro-4-phenylphenol; it is soluble in mineral spirits, toluene, benzene, ethanol, ethylene glycol monoethyl ether and most of the common organic solvents.

Example 8

231.4 grams of 2,3,4,6-tetrachlorphenol are added to a solution of 185 grams of "Coconut" amine in 139 grams of ethylene glycol monoethyl ether. The reaction is exothermic. The product consists of a 75% solution of "Coconut" amine 2,3,4,6-tetrachlorphenolate, and is miscible with mineral spirits, toluene, benzene, ethanol, and most of the common organic solvents.

Example 9

266.4 grams of pentachlorphenol are added to a solution of 266 grams of octadecenyl amine (Armour & Co.) in 532 grams of ethanol (anhydrous). The reaction is exothermic. The product consists of a 50% solution of octadecenylamine pentachlorphenate in ethanol. The solution is miscible with mineral spirits, toluene, benzene and other common organic solvents.

Example 10

260 grams of pentachlorphenol are reacted together with 185 grams of dodecylamine. This reaction is preferably carried out at elevated temperatures; e. g., about 230° F. A homogeneous compound is rapidly formed representing dodecylamine pentachlorphenolate. This end product is soluble in various organic solvents such as xylol, toluol, etc. It is also quite practical to carry out this reaction in the presence of solvents or vehicles so that the end product is formed within the solvent or vehicle.

Example 11

116 grams of 2,3,4,6-tetrachlorphenol and 130 grams of pentachlorphenol are commingled with 185 grams of dodecylamine at room temperature. The reaction is exothermic and the end product is rapidly formed. The multiple amine salt thus prepared is soluble in various organic solvents such as ethylene glycol monoethyl ether, toluol, butyl alcohol, etc.

Example 12

263 grams of pentachlorphenol are added to 133 grams of octadecenylamine and 92 grams of dodecylamine. There is also present 500 grams of amyl alcohol. The reaction proceeds speedily at room temperature. The end product represents a multiple amine salt in amyl alcohol solution. This solution may be readily diluted further upon the addition of various organic solvents such as mineral spirits, benzol, etc.

Example 13

135 grams of 2,2'-dihydroxy-5,5'-dichlorodiphenylmethane together with 125 grams of 2-bromo-4-phenylphenol are reacted with 100 grams of cocoanut amine and 140 grams of octadecyldimethylamine. There is also present 600 grams of ethylene glycol monoethyl ether. The reaction is carried out at around 150° F. and proceeds very rapidly. The end product thus obtained is a solution of a multiple amine salt. This solution may be readily diluted upon the addition of further quantities of solvents, and it may also be readily incorporated in various vehicles such as varnishes, etc.

The foregoing detailed description sets forth the invention in its preferred practical forms, but the invention is to be understood as fully commensurate with the appended claim.

Having thus fully described the invention, what I claim as new and desire to secure by Letters Patent is:

n-Dodecylammonium pentachlorophenate.

ARTHUR MINICH.

(References on following page)

REFERENCES CITED

The following references are of record in the file of this patent:

UNITED STATES PATENTS

| Number | Name | Date |
|---|---|---|
| 1,919,298 | Lehmann | July 25, 1933 |
| 2,189,420 | Hockenyos | Feb. 6, 1940 |
| 2,235,629 | Clifford | Mar. 18, 1941 |
| 2,280,546 | Schuler | Apr. 21, 1942 |
| 2,382,976 | Coleman | Aug. 21, 1945 |
| 2,385,719 | Migrdichian | Sept. 25, 1945 |
| 2,389,110 | Cook | Nov. 13, 1945 |
| 2,390,887 | Kling | Dec. 11, 1945 |
| 2,411,815 | Sowa | Nov. 26, 1946 |
| 2,417,809 | Coleman | Mar. 25, 1947 |